US012725205B1

(12) United States Patent
Samuel et al.

(10) Patent No.: US 12,725,205 B1
(45) Date of Patent: Sep. 1, 2026

(54) DOCUMENT ANOMALY DETECTION AND HEALTH ANALYSIS

(71) Applicant: Intuit Inc., Mountain View, CA (US)

(72) Inventors: John Samuel, Bangalore (IN); Vishal Kumar Singh, Bangalore (IN); Virendra Vaishnav, Bangalore (IN); Gokul Elumalai, Bangalore (IN); Pradeep Kurunimakki Laxminarayana, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/376,264

(22) Filed: Oct. 31, 2025

(51) Int. Cl.
*G06Q 40/06* (2012.01)
*G06F 40/226* (2020.01)
*G06V 30/42* (2022.01)

(52) U.S. Cl.
CPC ......... *G06Q 40/064* (2025.08); *G06F 40/226* (2020.01); *G06V 30/42* (2022.01)

(58) Field of Classification Search
CPC ..... G06Q 40/064; G06F 40/226; G06V 30/42
See application file for complete search history.

(56) References Cited

U.S. PATENT DOCUMENTS 10,949,852 B1 * 3/2021 Kramme ................ G06Q 20/34
11,422,992 B2 * 8/2022 Harale ..................... G06N 5/04
11,777,786 B2 * 10/2023 Elsakhawy ............. H04L 41/16
12,511,264 B2 * 12/2025 Bhat ................... G06F 16/1748
2005/0125322 A1 * 6/2005 Lacomb ................. G06Q 40/00 705/1.1
2025/0165650 A1 * 5/2025 Rahimov ............ G06F 21/6254
2025/0328633 A1 * 10/2025 Yang ..................... G06F 21/552
2025/0379780 A1 * 12/2025 Balachandran ..... H04L 41/0631
2025/0384382 A1 * 12/2025 Gebow ............ G06Q 10/06395
2025/0390477 A1 * 12/2025 Myers ................... G06F 16/215

FOREIGN PATENT DOCUMENTS

EP 4174795 A1 * 5/2023 ........... G06V 30/416
WO WO-2021039851 A1 * 3/2021 ............. H04L 12/12

OTHER PUBLICATIONS

Bakumenko et al.: Detecting Anomalies in Financial Data Using Machine Learning Algorithms, 2022, Systems/MDPI, pp. 1-29 (Year: 2022).*
Park, Taejin: Enhancing Anomaly Detection in Financial Markets Using an LLM-based Multi-Agent Framework, Mar. 28, 2024, pp. 1-17 (Year: 2024).*
Park, Taejin: Enhancing Anomaly Detection in Financial Markets with an LLM-Based Muti-Agent Framework, Mar. 28, 2024, pp. 1-17. (Year: 2024).*

(Continued)

*Primary Examiner* — Bijendra K Shrestha
(74) *Attorney, Agent, or Firm* — Dinsmore & Shohl LLP

(57) ABSTRACT

Certain aspects of the disclosure provide systems and methods for analyzing documents, including anomaly detection and health analysis. In some aspects, anomaly detection may further include root cause analysis to determine a foundational anomaly within the document. Health analysis, in some aspects, may further include scoring documents regarding the overall accuracy, completeness, and compliance of the documents. Remedial actions may be taken to reduce anomalies and improve health of documents.

17 Claims, 13 Drawing Sheets

(56) References Cited

OTHER PUBLICATIONS

Zhang et al.: Explainable Artificial Intelligence Applications in Cyber Security: State-of-the-Art in Research, Jul. 30, 2022, IEEE Access , pp. 1-36 (Year: 2022).*

Lee et al.: Out-of-Catergory Document Identification using Target-Category Names as Weak Supervision, Nov. 24, 2021, pp. 1-10 (Year: 2021).*

* cited by examiner

JSON 500

```
{
 "taxpayer_id" : "12345A" ,
 "name": "John Doe" ,
 "filing_status" : "Single" ,
 "tax_year" : 2022,
 'income_details" ; {
  "wages" : 55000,
  "interest_income" : 1200,
  "other_income" : 0
 },
 "deductions" : {
  "standard_deduction" : 12950,
  "itemized_deductions" : 0
 },
 "credits" : {
  "earned_income_credit" : 0,
  "child_tax_credit" : 0
 },
 "tax_withheld" : 6000,
 "estimated_taxes_paid" : 1000,
 "documentation" : {
  "form_1099_received" : true,
  "form_w2_received" : true
 }
}
```

*FIG. 5A*

JSON

550

```
{
  "health_score" :  94,
  "overall_rating" :  "Excellent",
  "issues_detected" :  [
    {
      "category" :  "Income reporting" ,
      "issue" :  "None"
    } ,
    {
      "category" ;  "Deductions" ,
      "issue" :  "No issue identified.  Clear choice of standard deduction with
adequate documentation."
    } ,
    {
      "category" :  "Documentation"
      "issue" :  "All supporting forms (W-2,  1099)  properly marked as received."
    }
  ],
  recommendations" :  [
    {
      "category" :  "Credits" ,
      "suggestion" :  "Check eligibility for available credits such as the Saver's Credit
to potentially reduce tax liabilities further. "
    }
  ]
}
```

FIG. 5B

JSON 600

```
{
 "taxpayer_id" : "78910B" ,
 "name" : "Jane Smith" ,
 "filing_status" : "Married Filing Jointly" ,
 "tax_year" : 2022
 "income_details" : {
  "wages" : 40000,
  "business_income" : 85000
  "interest_income" : 2000,
  "rental_income" : 12000
 },
 "deduction" : {
  "standard_deduction" : 0,
  "itemized_dedutcions" : 45000,
  "business_deductioins" : {
   "home_office" : 5000,
   "vehicle_epenses" : 3000,
   "supplies" : 2000
  }
 } ,
 "credits" : {
   "earned_income_credit" : 0,
   "child_tax_credit" : 4000
 },
 "tax_withheld" : 12000,
 "estimated_taxes_paid" : 5000,
 "documentation" : {
   "form_w2_received" : true,
   "form_1099_received" : true,
   "supporting_docs_for_deductionos" : false
  }
 }
```

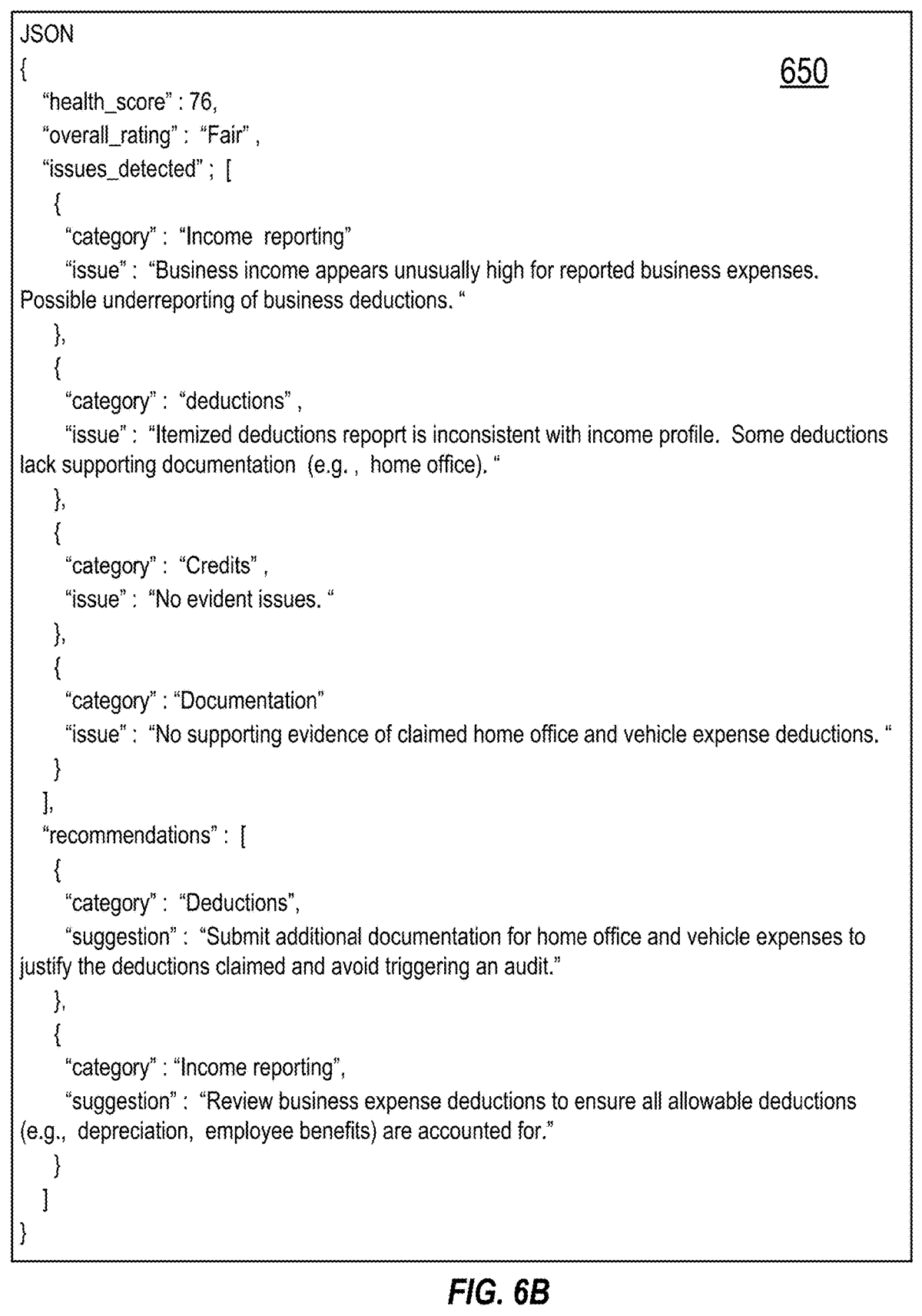

JSON
{
  "health_score" : 76,
  "overall_rating" : "Fair" ,
  "issues_detected" ; [
    {
      "category" : "Income reporting"
      "issue" : "Business income appears unusually high for reported business expenses. Possible underreporting of business deductions. "
    },
    {
      "category" : "deductions" ,
      "issue" : "Itemized deductions repoprt is inconsistent with income profile. Some deductions lack supporting documentation (e.g. , home office). "
    },
    {
      "category" : "Credits" ,
      "issue" : "No evident issues. "
    },
    {
      "category" : "Documentation"
      "issue" : "No supporting evidence of claimed home office and vehicle expense deductions. "
    }
  ],
  "recommendations" : [
    {
      "category" : "Deductions",
      "suggestion" : "Submit additional documentation for home office and vehicle expenses to justify the deductions claimed and avoid triggering an audit."
    },
    {
      "category" : "Income reporting",
      "suggestion" : "Review business expense deductions to ensure all allowable deductions (e.g., depreciation, employee benefits) are accounted for."
    }
  ]
}

FIG. 6B

JSON

700

```
{
  "taxpayer_id" : "66112C",
  "name" : "Robert Johnson",
  "filing_status" : "Single",
  "tax_year" : 2022,
  "income_details" : {
    "wages" : 0,
    "interest_income" : 5000,
    "dividends" : 25000,
    "capital_gains" : 85000,
    "rental_income" : 30000
  },
  "deductions" : {
    "standard_deduction" : 0,
    "itemized_deductions" : 20000
    "charitable_contributions" : 15000,
    "state_and_local_taxes" : 5000
  },
  "credits" : {
    "foreign_tax_credit" : 2000,
    "investment_tax_credit" : 0
  },
  "tax_withheld" : 50000,
  "estimated_taxes_paid" : 20000,
  "documentation" : {
    "form_1099_received" : true,
    "investment_reports_provided" : true,
    "rental_income_docs_provided" : true
  }
}
```

FIG. 7A

```
JSON
{                                                                 750
  "health_score" : 76,
  "overall_rating" :  "Fair" ,
  "issues_detected" ;  [
   {
     "category" :  "Income  reporting"
     "issue" :  "Business income appears unusually high for reported business expenses.
Possible underreporting of business deductions. "
   },
   {
     "category" :  "deductions" ,
     "issue" :  "Itemized deductions repoprt is inconsistent with income profile.  Some deductions
lack supporting documentation  (e.g. ,  home office). "
   },
   {
     "category" :  "Credits" ,
     "issue" :  "No evident issues. "
   },
   {
     "category" : "Documentation"
     "issue" :  "No supporting evidence of claimed home office and vehicle expense deductions. "
   }
  ],
  "recommendations" :  [
   {
     "category" :  "Deductions",
     "suggestion" :  "Submit additional documentation for home office and vehicle expenses to
justify the deductions claimed and avoid triggering an audit."
   },
   {
     "category" : "Income reporting",
     "suggestion" :  "Review business expense deductions to ensure all allowable deductions
(e.g.,  depreciation,  employee benefits) are accounted for."
   }
  ]
}
```

*FIG. 7B*

DOCUMENT ANOMALY DETECTION AND HEALTH ANALYSIS

BACKGROUND

Field

Aspects of the present disclosure relate to systems and methods for anomaly detection and health analysis of documents.

Description of Related Art

Document preparation and review is a common, albeit tedious process. Errors are also common. For example, calculation errors, factual inaccuracies, omissions, mistakes, misapplication of rules, regulations, or laws, may all result in errors in documentation. In high-risk industries, such as healthcare, finance, tax, accounting, engineering, education, government, and mathematics, to name a few, errors may lead to serious injury, loss of life, loss of assets, destruction of property, legal liability, and the like. Accordingly, there is a need for a technical solution for detecting errors so that they can be corrected and bad outcomes can be avoided.

Detection of such errors, however, proves to be technically difficult to automate. For example, spell checking functions check for misspellings of non-numeric data types by comparing a word against a reference dictionary. However, spell checking functions can still fail to detect contextual errors, for example, an incorrect word, missing or incomplete word, etc.

Furthermore, in many cases, a document may comprise a part of a set of documents, for example, a set of financial documents, a set of healthcare documents, a set of tax documents, a set of accounting documents, a set of engineering documents, a set of education documents, and the like. An error introduced into one document may be perpetuated into other documents in the set directly or by reference. For example, a calculation error in a financial document may be perpetuated into subsequent documents in the set. A later document may appear correct on its face, but rely on the incorrect calculation. As another example, a document with incorrect information may similarly appear correct on its face, but may make incorrect assumptions on the basis of the incorrect information.

Accordingly, there is a need for improved error detection within documents.

SUMMARY

Certain aspects provide a method for scoring document compliance. The method includes obtaining financial data from a set of financial documents; extracting a set of financial features from the financial data; processing the set of financial features with a machine learning model to generate a health score for the set of financial documents, the health score indicating one or more of an accuracy of the set of financial documents, a completeness of the set of financial documents, or a compliance of the set of financial documents with a financial area; and outputting, on a user interface, the health score and an explanation of the health score.

Certain aspects provide a method for anomaly detection. The method includes obtaining financial data associated with a set of financial documents; detecting an anomaly within the financial data with an anomaly machine learning model; parsing, the anomaly and the financial data, with a root cause machine learning model to determine the root cause of the anomaly within the financial data; providing, on a user interface, the anomaly and the root cause; and receiving, via the user interface, an indication of a remediation of the root cause.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

DESCRIPTION OF THE DRAWINGS

The appended figures depict certain aspects and are therefore not to be considered limiting of the scope of this disclosure.

FIG. 5A is a structured object depicting example data for analyzing the health of documents, such as used by the workflow shown in FIG. 5.

FIG. 5B is another structured object depicting example health data for documents, such as output from the workflow shown in FIG. 5.

FIG. 6A is another structured object depicting example data for analyzing the health of documents, such as used by the workflow shown in FIG. 5.

FIG. 6B is another structured object depicting example health data for documents, such as output from the workflow shown in FIG. 4.

FIG. 7A is another structured object depicting example data for analyzing the health of documents, such as used by the workflow shown in FIG. 4.

FIG. 7B is another structured object depicting example health data for documents, such as output from the workflow shown in FIG. 4.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
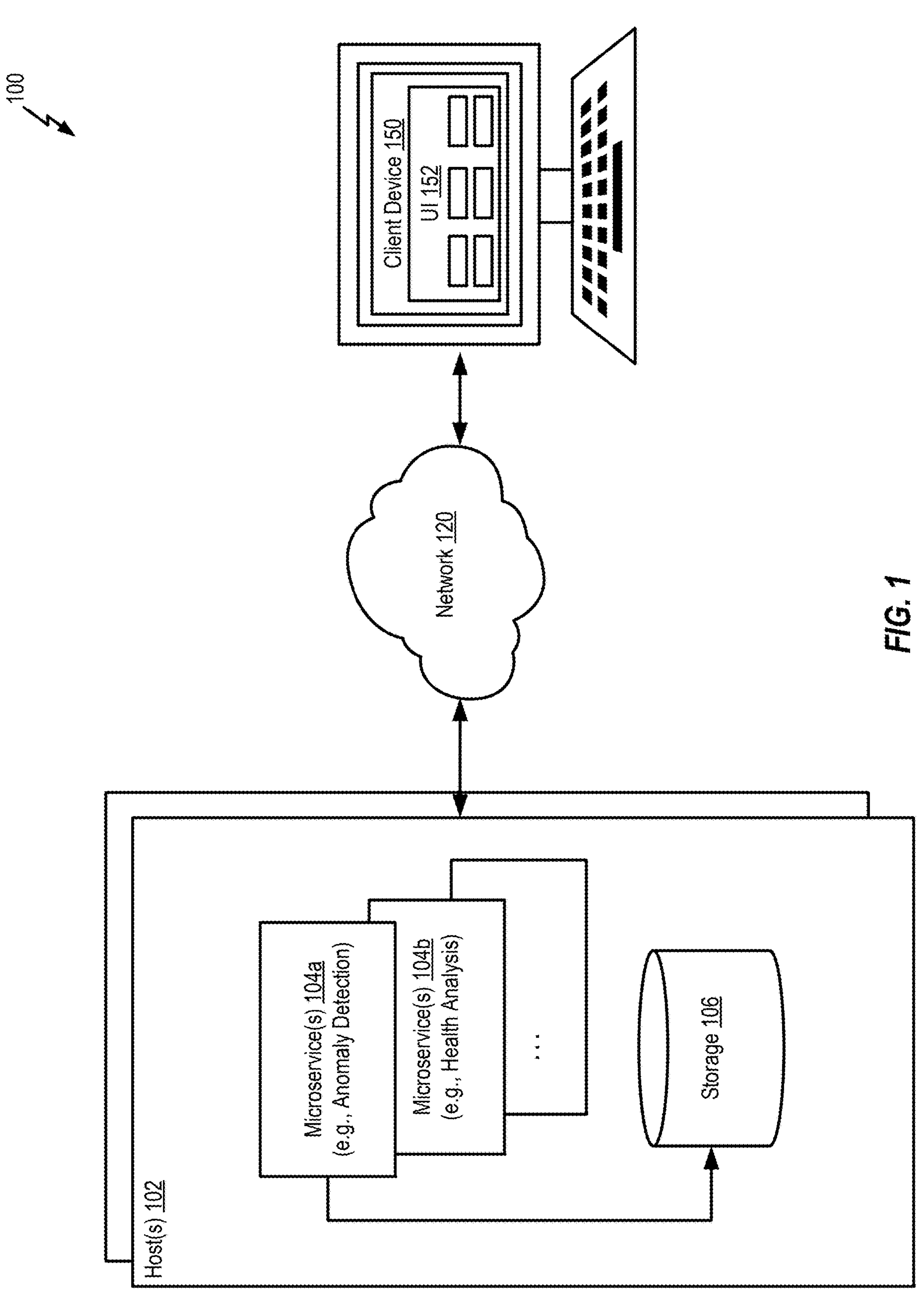
FIG. 1 is a schematic system diagram illustrating an example processing system supporting microservices interconnected via a network.

Aspects of the present disclosure provide apparatuses, methods, processing systems, and computer-readable mediums for anomaly detection and health analysis of documents.

"Document health" refers to a comprehensive assessment of a document's overall quality, accuracy, completeness, and compliance with relevant standards, rules, laws, or regulations. In the context of financial or tax documents, document health is typically quantified by a health score, which may be a numerical value or qualitative rating. This score reflects how well the document conforms to the truth, includes all necessary information, and adheres to applicable legal or regulatory requirements. Document health encompasses several dimensions, including: accuracy (the degree to which the information within the document is correct, consistent, and free from errors or miscalculations); completeness (the extent to which all required fields, data, and supporting documentation are present and properly filled out); and compliance (the measure of adherence to relevant standards, rules, laws, or regulations governing the domain of the document, such as tax codes or financial reporting standards). A document with high health is, generally, one that is accurate, complete, and compliant, thereby minimizing the risk of audit, rejection, or penalties. As described further herein, a document's health score may be generated using machine learning models that analyze both quantitative and qualitative features of the document, and may be accompanied by explanations and recommendations for improvement.

As used herein, a "document health score" or simply "health score" comprises an assessment of accuracy, completeness, and compliance of the document. In some aspects, a health score comprises a numerical score. In some aspects, a health score, alternatively or additionally, comprises a qualitative rating. Accuracy of a document is an assessment or degree to which the information within a document conforms to the truth and/or a standard. Completeness of a document is an assessment or degree to which the information within a document includes all necessary parts, elements, or steps. Compliance of a document is an assessment or degree to which the information and/or calculations within a document conforms to standards, rules, laws, or regulations.

Accordingly, document health is a multidimensional evaluation of a document's correctness, thoroughness, and regulatory conformity, typically expressed as a score or rating, and used to guide remediation and improve the quality of document submissions.

As described herein, anomaly detection, especially for a set of documents, poses technical difficulties due to the size and complexity of the set of documents. Furthermore, not every anomaly is obvious from reviewing the content of the document. As above, an anomaly may only be discernable based on reviewing it within the context of other related documents.

In some cases, an anomaly may be due to noncompliance with a set of rules, regulations, standards, or laws governing a domain of the documents. For example, a set of tax documents may not conform to a set of laws of a jurisdiction due to misapplication of a rule, rather than a data entry error.

Thus, it is a difficult technical problem to automate the detection of a variety of anomalies, as well as to determine a cause of the anomaly (e.g., where the anomaly was introduced into the documents), and downstream effects of the error. For example, in large document sets, or multiple sets of documents, it may be prohibitively time-consuming to manually review each document for errors and/or compliance with rules, regulations, laws, etc. Further, it may be difficult to identify anomalies that are perpetuated elsewhere in the set of documents, and separate those from straightforward data entry type errors.

Accordingly, aspects described herein overcome the aforementioned technical problems and improve upon the state of the art by introducing services, systems, and methods for anomaly detection and health analysis for documents. In some aspects, anomaly detection methods may be utilized to determine anomalies within a set of documents and determine root-causes of such anomalies. A "document anomaly" refers to a deviation, inconsistency, or error within a document that departs from expected patterns, standards, or norms for the relevant domain. An anomaly may manifest as a mistake or a wrong piece of information, including incorrect text, numerical data, miscalculations, misspellings, misuse of terms, or improper application of rules, laws, or standards. In some cases, an anomaly may result from incomplete, missing, or misused information, or from noncompliance with domain-specific requirements. Certain aspects, additionally or alternatively, provide for scoring an overall health of the documents.

As used herein, an anomaly comprises a mistake or a wrong piece of information, including text or numerical information. In some aspects, an anomaly may be based on a miscalculation or a mathematically incorrect determination. In some aspects, an anomaly may comprise a misspelling or misuse of a term. In some aspects, an anomaly may comprise a wrong application of a rule, law, or standard of a piece of information. In some aspects, an anomaly may comprise use of incorrect, incomplete, or misused information. As described herein, in some aspects, an anomaly may be detected within one or more documents through a machine learning-based anomaly detection algorithm. Anomaly detection machine learning techniques identify deviations from expected patterns. In some aspects, an anomaly detection model may be trained based on "normal" or "correct" training data to flag data that does not fit the model, thereby identifying a deviation from the expected. Exemplary machine learning models which may be utilized for anomaly detection may include forest-based trees, for example, isolation or random forests, support vector machines (SVM), neural networks, including autoencoders, local outlier factor (LOF), or k-nearest neighbors (KNN).

As used herein, a document may refer to a structured or unstructured piece of text or graphics, for example, a text document, a form, a webpage, a record, a table, and the like. In some examples, a document may include a source code file, a programming documentation, a markup language (e.g., HTML, XML, etc.) document, a configuration file, a style sheet, a build file (e.g., Makefiles, Maven pom.xml, etc.) an API specification, a query language specification (e.g., SQL, GraphQL, OpenAPI, etc.), or a protocol specification. Documents may be in a set of interrelated documents. For example, documents related to a particular business, person, place, activity, date, event, and/or the like. Documents may relate to a variety of domains, healthcare, finance, tax, accounting, engineering, education, government, and mathematics, to name a few. By way of example, a set of tax documents may comprise a tax return filing package. A set of financial documents may comprise a set of accounting documents. A set of education documents may comprise a subject, chapter, section, or standard for an educational environment.

As used herein, a root cause of an anomaly comprises an underlying or initial reason the anomaly was introduced into the document. In some aspects, a root cause of an anomaly may comprise a location or portion of one or more documents where the anomaly was introduced (e.g., is present) within the document(s). In some aspects, a root cause may be temporal, wherein the root cause may comprise a time (e.g., earliest) the anomaly was introduced. In some aspects, a root cause may comprise a first location or time where the anomaly was introduced. Identification and correction of a root cause may reduce recurrence of issues, increasing quality and efficiency. In some aspects, a root cause of the anomaly within a document or set of documents may be determined with a machine learning model trained to determine a cause of the anomaly. Beneficially, determination of a root cause enables detection of related errors within a document (or a set of related documents), as well as an appropriate location for correction. For example, where an anomaly occurs in a later section of a document due to an issue in an earlier section of the document, it is necessary to correct the earlier anomaly in order to remedy the related anomalies in later dependencies. Thus, anomalies can be fully corrected, and other related anomalies, can also readily be identified and corrected.

Furthermore, aspects described herein provide for visualization of detected anomalies, root-causes, and health scores. For example, one or more documents of a set of documents may be displayed on a user interface along with one or more of a detected anomaly, a root-cause of an anomaly, or a health score. Therefore, anomalies may be readily corrected. Further, in some aspects, a recommendation of remedial actions, e.g., corrections to the document, may be visualized. For example, a recommended remedial action may be visualized proximate to a location of an anomaly within a document. In some aspects, remedial actions may include anomalies to be corrected, incorrect information to be corrected, mathematical miscalculations to be recalculated, missing or incomplete information to be provided, and/or the like. Beneficially, visualization of detected anomalies, root causes, health scores, as well as remedial actions may enable efficient resolution and remediation of documents. Further, in some cases, a collaborative interface may be provided, enabling collaborative resolution and remediation of documents.

Example System for Anomaly Detection and/or Health Analysis

FIG. 1 depicts an example system 100 supporting a plurality of microservices 104 (e.g., software-defined services, which in some cases, may be cloud-native). As shown in FIG. 1, system 100 includes one or more client devices 150 (collectively referred to herein as "client devices 150") and one or more hosts 102 (collectively referred to herein as "hosts 102"). A network 120 may provide connectivity between client device 150 and host 102. Network 120 may include, for example, a direct link, a local area network (LAN), a wide area network (WAN) (such as the Internet), another type of network, or a combination of one or more of these networks.

Host 102 may be geographically co-located servers on the same rack or on different racks in any arbitrary location in a data center. Host 102 may be implemented on a server-grade hardware platform. Host 102 or the hardware platform may include components of a computing device, such as one or more processors (e.g., central processing units (CPUs)), one or more memories (e.g., random access memory (RAM)), one or more network interfaces (e.g., physical network interfaces (PNICs)), storage 106, and/or other components, as described elsewhere herein. Storage 106 and other example components of an apparatus that may implement host 102 are described elsewhere herein.

Host 102 in system 100 may host a set of one or more microservices 104*a-b* (collectively referred to herein as "microservice(s) 104"). The microservice(s) 104 may be deployed using virtual machines (VMs) and/or container(s) implemented on host 102). For example, host 102 may implement a hypervisor (not shown) that abstracts processor, memory, storage, and networking resources of host 102's hardware platform). Generally, a microservice 104 is a loosely coupled and independently deployable service or software that, alone or in combination with one or more other microservices 104, may make up an application. Microservice(s) 104 may enable segmented, granular level functionalities within a larger system infrastructure. A reference to a single microservice 104 can encompass multiple microservices 104, unless context indicates otherwise.

Client device 150 may include a user interface (UI) 152. UI 152 may be usable to communicate with microservice(s) 104 via network 120. For example, communication between client devices 150 and a microservice 104 may be facilitated by one or more application programming interfaces (APIs). An API is a set of rules and protocols that allows different software applications to communicate and share data with each other. Non-exhaustive examples of client devices 150 may include a smartphone, a personal computer, a tablet, or a laptop computer. In some examples, microservice(s) 104 may interact with another microservice, an application, a host, or the like, via network 120.

As shown in FIG. 1, in certain aspects, microservice 104*a* implements an anomaly detection service, which is any network 120 accessible service that detects, determines, or otherwise analyzes documents for animals. In some aspects, the anomaly detection service or another microservice 104*a* may implement a machine learning module that trains a machine learning model to detect, determine, or analyze document data for anomalies.

In certain aspects, microservice 104*b* implements a health analyzer service, which is any network 120 accessible service that detects, determines, or otherwise analyzes document(s) for a health of the document(s). In some aspects, the health analyzer service or another microservice 104*b* may implement one or more machine learning modules that trains a machine learning model to detect, determine, or analyze document data for health of the document(s). A microservice 104*b*, or a host 102 that implements a microservice 104*b*, may be referred to as an apparatus.

Though FIG. 1 depicts host 102, storage 106, and client device 150 as single devices for ease of illustration, host 102, storage 106, and/or client device 150 may be embodied in a variety of forms. Further, though FIG. 1 depicts only one host 102 and one client device 150, other examples may include a different number of hosts 102 and/or client devices 150. Client devices 150 may use any combination of microservices 104 on any host 102 where microservices 104 are deployed.

Example System for Anomaly Detection and/or Health Analysis

Figure 2:
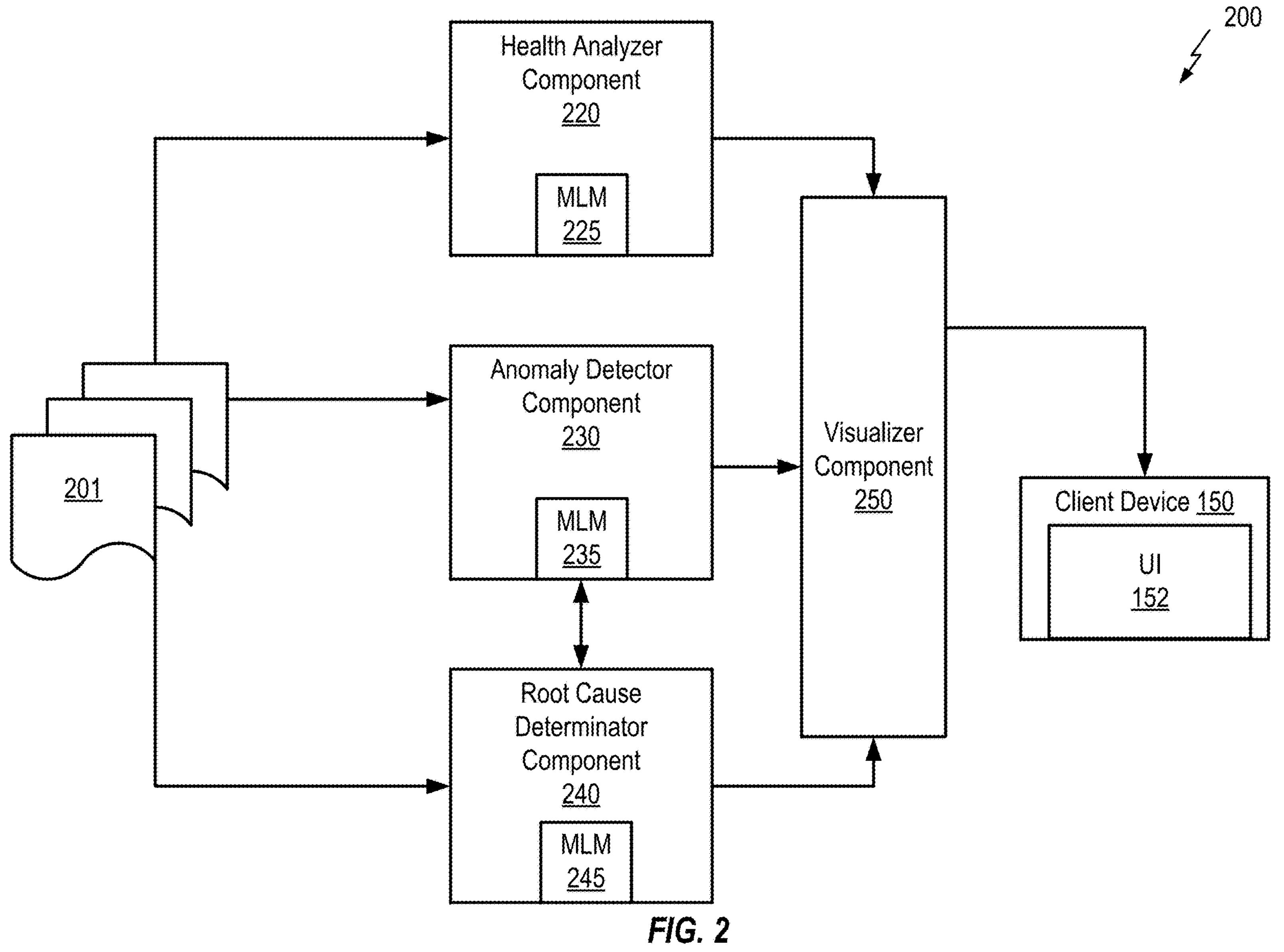
FIG. 2 is a schematic system diagram illustrating an example system for anomaly detection and/or health analysis.

FIG. 2 depicts an example system 200 for detecting, determining, and/or analyzing a set of documents 201, for example, analyzing the health of the set of documents 201 and/or detecting an anomaly within the set of documents 201.

In some aspects, the set of documents 201 may be processed by a health analyzer component 220 configured to generate a health score for the set of documents 201. Health analyzer component 220 may be an example of microservice 104*b* of FIG. 1. In some aspects, the health analyzer component 220 is configured to utilize a health scoring model 225 to generate the health score for the set of documents 201.

In some aspects, the set of documents 201 may be processed by an anomaly detector component 230 configured to detect one or more anomalies within the set of documents 201. The anomaly detector component 230 may be an example of microservice 104*a* of FIG. 1. In some aspects, the anomaly detector is configured to utilize an anomaly detection model 235 to detect the one or more anomalies within the set of documents 201.

In some aspects, the set of documents 201 may be processed by a root cause analyzer component 240 configured to determine a root cause of an anomaly within the set of documents 201, for example, an anomaly detected by the anomaly detector component 230. The root cause analyzer component 240 may be an example of microservice 104*a* of FIG. 1. In some aspects, the root cause analyzer component is configured to utilize a root cause analysis model 245 to determine the root cause of the anomaly within the set of documents 201.

A visualizer component 250 is configured to visualize, on a UI 152 of a client device 150, one or more of the health score, the anomaly, and/or the root cause, for a user's review and interaction.

Though FIG. 2 depicts components 220, 230, 240, and 250 separately for ease of illustration, one or more of components 220, 230, 240, and/or 250, may be embodied in a variety of forms.

Example Workflow for Anomaly Detection

Figure 3:
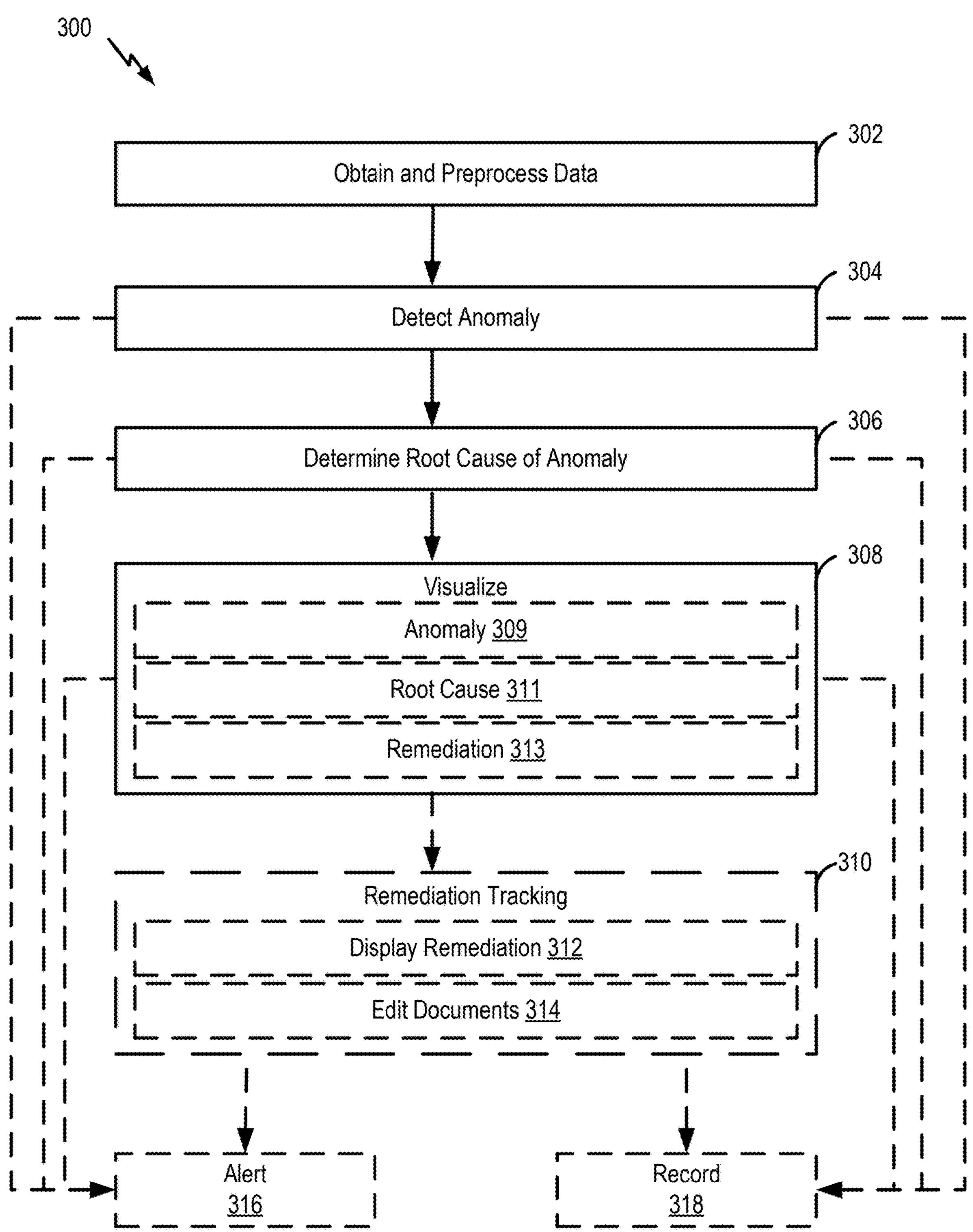
FIG. 3 is a workflow diagram illustrating an example workflow for anomaly detection within documents.

FIG. 3 depicts an example workflow 300 for detecting, determining, and/or analyzing anomalies within documents. Aspects of workflow 300 may be implemented by one or more microservices 104 in FIG. 1.

Initially, workflow 300 begins at block 302 with obtaining data from one or more documents. In some aspects, the one or more documents comprise financial documents, for example, accounting documents or tax documents. In some aspects, the one or more documents may comprise regulatory or compliance documents. Other types of documents may be utilized, for example, health, scientific, employment, education, or other types. In some aspects, the one or more documents may comprise a set of documents, for example, a set of interrelated documents.

Workflow 300 proceeds to block 304 with detecting an anomaly within the data. In some aspects, an anomaly within the data may be detected by processing the data with an anomaly detection machine learning model. For example, the anomaly detection machine learning model may be trained to detect a deviation from a pattern of expected document data.

For example, a machine learning model, such as the Local Outlier Factor (LOF) model, evaluates the data to compute an anomaly scores.

Another example machine learning model includes a K-nearest neighbor (KNN) model. KNN is density-based classifier or regression modeling tool used for anomaly detection. KNN uses labeled data and variable data, and the regression model finds relationships between the data. KNN is based on the assumption that similar data points will be found near each other. If a data point appears further away from a dense section of points, it is considered an anomaly.

Workflow 300 then proceeds to block 306 with determining a root cause of the anomaly within the document(s). In some aspects, a root cause of the anomaly within the data may be determined with a root cause machine learning model. For example, the root cause machine learning model may be trained to parse the data and the detected anomaly to determine a root cause of the anomaly. In some aspects, the root cause machine learning model comprises a decision tree or a causal inference model. A casual inference model may be used to find an initial cause of the detected anomaly, not just correlations (e.g., other errors due to the same initial cause). In some aspects, a root cause machine learning model may further be trained or fine-tuned on an area, type, or domain of documents.

One example of root cause analysis may occur in a set of tax filing documents. For example, a detected anomaly may be that the calculated tax liability is unusually high (e.g., at block 304), whereby the high tax liability on Form 1040 is flagged. A causal inference machine learning model, in this example, may be used to map all data dependencies. The model then performs a counterfactual analysis to determine "What is the smallest upstream input change that would normalize the Tax Liability?" Then, the model utilizes path tracing to trace a backwards path based on dependencies in the map. In this example, the high tax liability is caused by an abnormally low adjusted gross income (AGI) calculation. The path tracing continues and finds the AGI is low because the set of documents is missing a mandatory Form 1099 recording investment income. Thereby, the model may output the root cause of the detect anomaly, the unusually high tax liability: "Missing required input: Form 1099 for investment income."

This root cause provides an improvement by identifying the foundational omission—the missing document—not the resulting calculation error. By showing the effect of a change (e.g., "Adding the 1099 will reduce the liability by $X"), it guides a user to a single, correct remediation.

Workflow 300 proceeds to block 308 with visualizing the detected anomaly 309 and/or the root cause 311 on a user interface, for example, UI 152 on a client device 150, shown in FIG. 1. In some aspects, a suggested remediation 313 may also be visualized on the user interface. In some aspects, visualizing the detected anomaly and/or the root cause may include visualizing a chronological mapping of the data of the document, as well as the detected anomaly and/or the root cause. In some examples, the chronological mapping may include a heat map or a temporal graph. A chronological mapping may depict entries and/or edits to a document in a temporal manner, e.g., based on timestamps associated with the document. Additionally, in some aspects, a chronological mapping may include filtering options to segment the data displayed, for example, by categories of data, time periods, edits, types of documents, and other criteria relevant to the area, type, or domain of document.

A chronological mapping provides interactive visual diagnostics, enabling users to trace anomalies quickly through both time and data dependencies. For example, a chronological and temporal graph visualizes the lineage of data across the set of documents and time. For example, if an anomaly is detected in the final tax return (Form D), the graph highlights the entire dependency chain backward. This might reveal the temporal root cause—for instance, a manual override on Form B three weeks ago that started the error propagation. This helps users understand when the problem was introduced into the workflow.

A heat mapping provides a risk assessment overlay on the set of documents themselves. For example, fields that have been edited most frequently, or those whose values deviate most from expected norms, may be indicated as "hot", e.g., through coloring such as red. A user can readily see the indicated section, e.g., a deductions section is the riskiest area. Clicking on the hot spot guides them directly to the spatial root cause—the exact line item where the initial incorrect figure was entered. Additionally, filtering options allow segmenting this data by categories (e.g., viewing only edits made by a specific preparer).

Together, these maps transform static documents into dynamic, searchable compliance histories, allowing professionals to move seamlessly from the symptom to the definitive origin of the error.

In some cases, the chronological mapping may include a temporal graph. The temporal graph is an interactive visualization used to trace the lineage of an anomaly through time and across interconnected documents, helping pinpoint the initial error. The temporal graph may illustrate the root cause of an anomaly within the set of documents. For example, the graph may show interconnected nodes representing document fields, calculations, and manual edits arranged chronologically. A user may then be able to select different nodes, for example, an anomalous tax liability node. The graph may then highlight the causal path backwards.

Thus, instead of pointing to a simple calculation error, the graph may visualize tracking back to the root cause. In this example, to a specific manual override action performed by a junior accountant last Tuesday on the deductions carryover field of an auxiliary document (Form B).

Thus, the root cause is depicted as visual path identifies the temporal root cause—the exact point in time and the specific user action that introduced the error into the system. This enables immediate and precise corrective action, ensuring the underlying issue is fixed, not just the symptom In some aspects, workflow 300 then proceeds to block 310 with tracking remediation of the detected anomaly and/or root cause. In some aspects, one or more remediation suggestions may be provided on a user interface at block 312, for example, as part of the visualization of the detected anomaly and/or root cause.

In some aspects, tracking remediation may include receiving an indication of a remediation of the anomaly and/or root cause, for example, via the user interface. For example, at block 314, an indication of an edit to one or more documents may be received through the user interface.

In some aspects, at least one document may be provided on the user interface, for example, to enable a user to review and/or edit the document to correct the anomaly and/or the root cause. A user may then edit the document on the user interface. In some examples, a document, the anomaly, and/or the root cause may be displayed for a plurality of users, for example, as part of a collaborative interface, to enable multiple users to access, review, and/or edit the document.

In some aspects, workflow 300 may further include alerting (block 316) a user of the anomaly and the root cause (e.g., on the user interface). In some aspects, alerting on the user interface may include a graphical user interface element to indicate the anomaly and the root cause. In some aspects, alerting on the user interface may further or alternatively include an audible alert or alarm from a user device.

In some aspects, workflow 300 may further include recording (block 318) the anomaly, the root cause, and the remediation (e.g., on a distributed ledger). In some aspects, the distributed ledger may include a blockchain whereby a tamper-proof record is created. In some aspects, additional information recorded on a distributed ledger may include timestamps, user identifications, action details, and the like. For example, timestamps may include those associated with a time the anomaly was detected within the document, a time the root cause was detected within the document, a time the anomaly was introduced into the document (e.g., written or recorded in the document), a time the root cause was introduced into the document (e.g., written or recorded in the document), a time of editing of the document (e.g., a remediation of the anomaly or root cause), and the like. As another example, user identifications may include those of a user creating, editing, or revising a document, and may be recorded. As yet another example, action details such as documentation of an edit or revision to a document, a status of an edit or revision, additional step(s) to remediate the anomaly and/or root cause.

Note that FIG. 3 is just one example of a workflow, and other flows including fewer, additional, or alternative operations are possible consistent with this disclosure.

Example Workflow for Health Analysis

Figure 4:
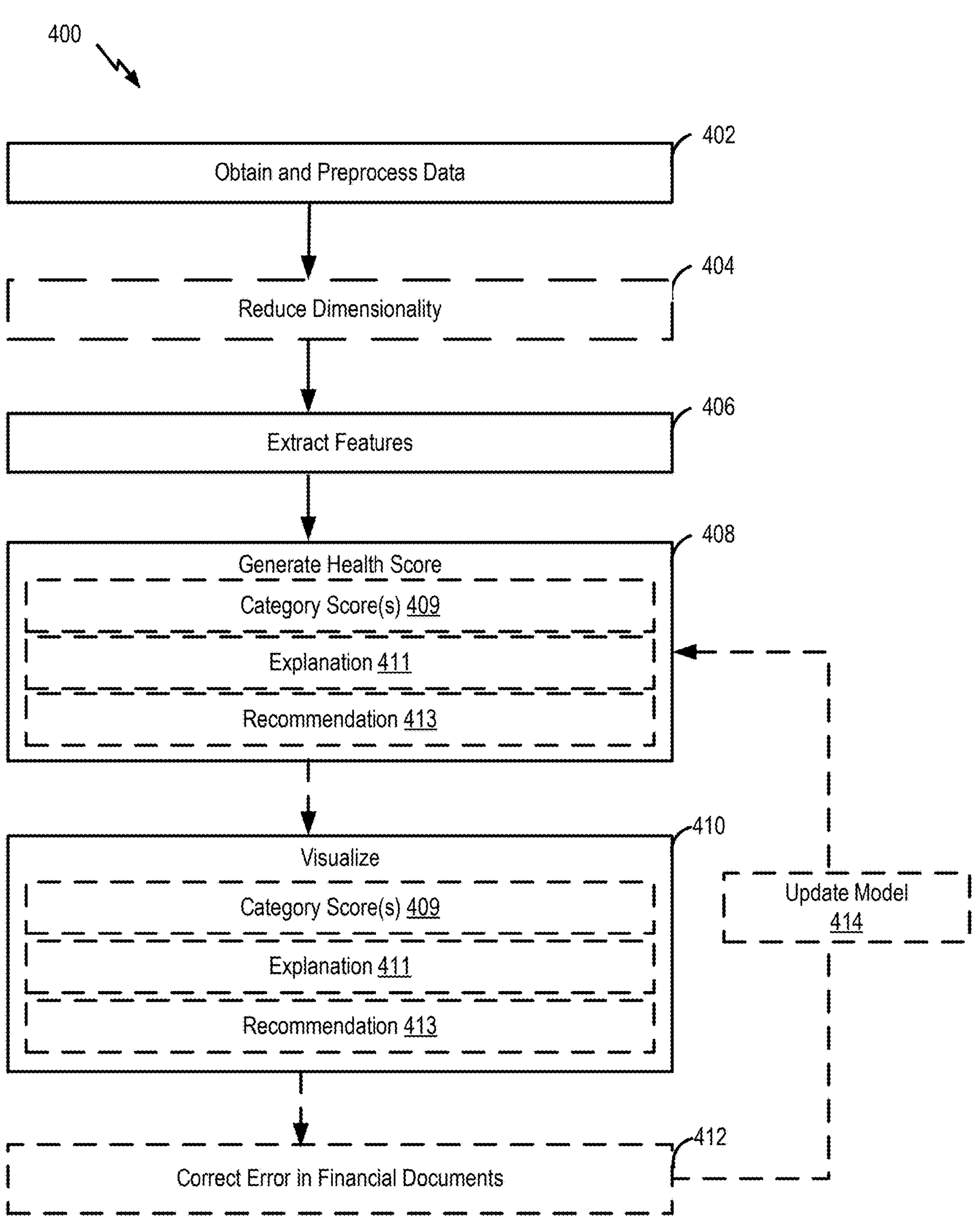
FIG. 4 is a workflow diagram illustrating an example workflow for analyzing the health of documents.

FIG. 4 depicts an example workflow 400 for detecting, determining, and/or analyzing health of document(s). Aspects of workflow 400 may be implemented by one or more microservices 104 in FIG. 1.

Initially, workflow 400 begins at block 402 with obtaining data, for example, from one or more documents. In some aspects, the one or more documents comprise financial documents, for example, accounting documents or tax documents. In some aspects, the one or more documents may comprise regulatory or compliance documents. Other types of documents may be utilized, for example, health, scientific, employment, education, or other types. In some aspects, the one or more documents may comprise a set of documents, for example, a set of interrelated documents.

In some aspects, workflow 400 further includes preprocessing each document of the one or more documents using natural language processing to generate a machine-readable document. For example, natural language processing techniques, including embedding models such as BERT or a GPT model may be used to tokenize free form text into a structured format. Then, the document is anonymized to redact or remove personally identifiable information. The anonymized machine-readable document may then be converted into a structured object comprising the data. In some aspects the structured object comprises a JSON object or an HTML object. FIGS. 4A, 5A, and 6A depict example structured objects.

In some aspects, a structured object comprises a plurality of fields, such as key-value pairs. The structured object enables standardization of data in documents. In particular, a key-value pair comprises a key and a value associated, or paired, together. The key defines the data indicated by the value. For example, the key may be a name, identifier, label, or property of the data indicated by the value. The value may contain data as plain text in a single or multiple lines, an array, an image, a video, icon, or even another key-value pair. For example, a key may be "taxpayer name" and the value may be "John Smith."

In some aspects, preprocessing the data further includes validating each field of the structured object contains data. For example, missing or incomplete fields may be indicated as incomplete.

Optionally, in some aspects, workflow 400 proceeds to block 404 with reducing dimensionality of the data. Dimensionality refers to the number of attributes or variables in a dataset, in this example, a number of fields of the structured object. Some documents may have a high volume of data, for example, large sets of documents, resulting in a large number of key-value pairs. The dimensionality of such data may be reduced, thereby reducing complexity, and focusing on the features most relevant to health scoring. In some aspects, dimensionality reduction techniques such as Principal Component Analysis (PCA) or t-distributed stochastic neighbor embedding (t-SNE) may be used to reduce dimensionality of the data.

Reduction of dimensionality enables a faster, more stable machine learning model by reducing overfitting. Before, data is thousands of raw fields (high-dimensionality). After, data is a smaller set of principal features (low-dimensionality), focusing only on the variables most relevant to accurate compliance and health scoring. Therefore, the machine learning model does not need to fit extraneous variables, but rather only uses relevant variables.

Workflow 400 then proceeds to block 406 with extracting one or more features from the data, for example, from the structured object. In some aspects, fields may be identified from the structured object as features. Fields may be characterized as quantitative fields or qualitative fields. A quantitative field contains quantitative data, such as numerical data. A qualitative field contains qualitative data, such as descriptive data. In some aspects, at least one quantitative field and at least one qualitative field are identified from the structured object as features.

In some aspects, one or more fields may be contextualized. Contextualization may include adding additional information to each field, for example, based on historical information, an area, type, or domain of documents, or other information related to the document(s). Contextualization is controlled feature engineering, not raw dimensionality increase. Example: $\text {Taxpayer Age}=70$ is converted into a feature: $\text {Eligible for Elderly Deduction}=\text {TRUE} $ (based on tax code lookup). This adds a highly relevant, single, compliance-focused feature, boosting the machine learning model's accuracy without significant computational cost.

Then, in some aspects, the contextualized fields may be added to a set of features extracted from the structured object.

Workflow 400 then proceeds to block 408 with generating a health score for the one or more documents. The health score may indicate an accuracy of the documents, a completeness of the documents, and/or a compliance of the documents. An accuracy of the documents may be based on whether one or more values within the document are correct and consistent. For example, in a tax document domain, accuracy may include whether an income reported on a tax return matches W-2 income. A completeness of the documents may be based on whether the documents are missing any information. For example, in a tax document domain, completeness may include whether all fields on a form contain data or whether the set of documents includes all required documents (e.g., types of supporting documents). A compliance of the documents may be based on whether the documents adhere to the rules, regulations, standards, or laws of the area or domain of the documents. For a tax document domain, compliance may include whether the documents are consistent with an applicable jurisdiction's tax laws and regulations.

In some aspects, the health score comprises a numerical score and/or a rating. For example, a numerical score may be on a scale (e.g., 0-10, 0-100), where a higher score indicates a healthier document. A healthier document may be one where the document comprises fewer (if any) anomalies, missing information, and complies with one or more standards, rules, regulations, or laws associated with the area, type, or domain of documents. A rating, in some examples, may be a qualitative assessment of the documents.

In some aspects, the health score may comprise a sum of a set of category scores 409. For example, a score may be assigned for a set of categories of the documents. Categories may be based on an area, type, or domain of the documents. For example, in a tax domain, categories may include types of documents (e.g., return, supporting documentation, source documentation), factors (e.g., income, deductions, credits, documentation), and the like. As another example, in an accounting domain, categories may include types of documents (e.g., journal, balance sheet, income statement), types of data (e.g., expenditures, purchase orders, credits, timecards), business types, and the like.

In some aspects, the set of category scores may comprise an accuracy score, a completeness score, and a compliance score.

The health score may be generated based on the set of features. For example, in some aspects, a health score may be generated with a machine learning model. A machine learning model may be trained to detect an anomaly within the documents. For example, the machine learning model may be trained to detect an anomaly within one or more fields of the set of fields, such as a contextualized field. In some aspects, the machine learning model is trained on a corpus of financial documents comprising at least one compliant financial document and at least one financial document with an anomaly. Training with labeled erroneous documents to creates a robust error classification and prediction model, not just an outlier detector. This allows the model to accurately identify the type of anomaly, predict its severity, and determine its root cause, leading to a much more meaningful and actionable health score.

The machine learning model may be configured to process one or more fields, for example, one or more contextualized fields of the set of fields, to generate the health score.

In some aspects, the machine learning model comprises a long short-term memory network (LSTM) or a transformer. The machine learning model may be trained using large corpora of text. The training process involves adjusting the model's parameters to minimize the difference between its predicted word probabilities and the actual word sequences in the training data. This is typically done via techniques like maximum likelihood estimation and gradient descent. The training data set used at this stage of training is typically configured as a general-purpose training dataset, meaning the model is trained to perform a wide range of tasks, including language understanding across many different knowledge domains. For example, models are trained on vast datasets that often include diverse and extensive sources of text from the internet, books, articles, and various other textual corpora (e.g., domain-specific corpora).

In some aspects, the machine learning model is fine-tuned with domain knowledge, for example, a corpus of domain-specific documents, standards, and outcomes. In some aspects, the machine learning model may be augmented with domain knowledge, for example, through a retrieval augmented generation (RAG) process, whereby additional and/or specific domain knowledge may be retrieved from a corpus of domain-specific documents, standards, and outcomes.

In some aspects, based on a health score of the set of documents, one or more operations of workflow 300 may be performed. For example, if a health score is low, workflow 300 may proceed to detect an anomaly and determine the root cause of the anomaly. Thereby, the root cause of a low score may be determined.

In some aspects, an explanation 411 of the health score may also be generated. In some aspects, the explanation may be generated with explainable artificial intelligence (XAI) based on the machine learning model. XIA is the process of revealing the decision-making mechanism of a machine learning model. Often machine learning models are considered "black boxes" in which it is not known how or why a model produced a specific inference. Explanations of how the model behaves and what influences its inferencing, improves confidence in the outputs of the model. Additionally, XAI may be useful to understand causes (e.g., root causes) for outputs of the model. Specifically, in some aspects, XAI processes may provide an explanation for how and why the model assigned the health score. For example, which inputs most significantly influenced the health score. XAI-generated explanations may provide insights into how the health score, and/or category scores were generated, including which input features reduced or improved the score.

The XAI explanation is an integrated output generated post-inference, often using a secondary analysis model to probe the main machine learning model's decision. In some aspects, the secondary XAI model may comprise a SHapley Additive explanations (SHAP) model. The model may output, for example, "Score reduced because Itemized Deductions were weighted $\mathbf {40\%} $ lower due to missing supporting documentation."

Where the health score comprises a set of category scores, the explanation may include a reason for each category score. For example, the reason may comprise an anomaly in the accuracy of the set of documents associated with the category of data. As another example, the reason may comprise an anomaly in the completeness of the set of documents associated with the category of data. As yet another example, a reason may comprise an anomaly in the compliance of the set of documents associated with the category of data.

In some aspects, the explanation may include a recommended action 413 to correct an anomaly in the set of documents. For example, the explanation may include a recommended remedial action to correct the anomaly. Where the explanation includes a reason for a category score, the explanation may include a recommended remedial action to correct the anomaly with the category score.

Workflow 400 proceeds to block 410 with visualizing the health score 411 on a user interface, for example, UI 152 on client device 150 in FIG. 1. In some aspects, the explanation 411 of the health score may also be visualized on a user interface. In some aspects, the recommendation 413 may also be visualized on a user interface. In some aspects, the health score, the explanation, and/or the recommended remedial action may be outputted as a score card. A score card may comprise a structured object indicating an overall health score, one or more category scores, an explanation of one or more scores, and one or more recommendations.

FIGS. 4A-4B depict example structured objects representing a set of documents and a scorecard for said documents. In the example structured object 500 depicted in FIG. 5A, the set of documents comprises a tax return for an individual taxpayer. The structured object 500 includes identification fields, including a taxpayer_id, name, filing status, and year. The structured object 500 further includes income detail fields, including sub-fields, for example, different types of income. The structured object 500 further includes deduction detail fields, including standardized deduction and itemized deduction sub-fields. The structured object 500 further includes a credits field and various credit sub-fields. Additionally, the structured object 500 includes tax paid fields, including subfields for withheld tax and estimated taxes paid, as well as documentation to support income and taxes paid (e.g., tax forms W-2 and 1099). In other document types, other fields and/or additional, fewer, or other sub-fields are possible.

FIG. 5B depicts an example structured object 550 representing a score card for the documents represented by structured object 500. The overall health score for the set of documents represented by structured object 500 is 104 (e.g., in this example, based on a 0-100 scale), and an overall excellent rating. The higher score of the set of documents indicates a near-perfect tax return. Additionally, the structured object 550 includes a plurality of recommendations for various categories of the structured object 500. Specifically, the structured object indicates there are no issues with the income reporting category, no issues with the deductions, and all supporting documents are received. All required forms to be included with the tax return are accounted for within the set of documents, and information is consistent between documents. Additionally, the deduction selection is appropriate under the applicable rules and laws, and does not conflict with other selections within the set of documents. However, within the credits category, a recommendation to check eligibility for additional credits as there may be credits which apply, but are not listed within the documents. While no anomaly is indicated, e.g., the documents are accurate, additional information and selections, such as additional credits, may apply under the laws and rules, thus, the documents could be improved.

FIGS. 5A-5B depict example structured objects representing a set of documents and a score card for said documents. In particular, FIG. 5A depicts an example structured object 600 representing a set of documents, in this case, a tax return for a small business owner. The structured object 600 includes a variety of fields and associated data, such as identification information. Additionally, the structured object 600 includes an income field with various income sub-fields, a deduction field with various deduction sub-fields, and a credit field with various credit sub-fields. The structured object 600 also includes taxes paid fields and supporting documentation fields.

FIG. 5B depicts an example structured object 650 representing a score card for the set of documents represented by the structured object 600. The overall health score for the set of documents represented by structured object 600 is 76 (e.g., in this example, based on a 0-100 scale), and an overall fair rating. The lower score compared to the example of FIG. 5A reflects inconsistencies in the itemized deductions and missing documents, which could trigger an audit by tax authorities due to noncompliance with tax regulations. Additionally, the structured object 650 includes a plurality of issues (anomalies) spotted within the set of documents, including business expenses appearing to be inadequately reported and making business income seem disproportionately higher. Supporting documentation for specific expenses including the home office and vehicle expenses was not provided, indicating incompliance with regulations and reducing a compliance score. The structured object 650 further includes a plurality of recommendations for various categories of the structured object 600. Specifically, the issue field indicates there is missing documentation, and the recommendation fields indicate to review the business deductions thoroughly to ensure legitimate expenses are included to reduce reported income, no issues with the deductions, and all supporting documents are received.

FIGS. 6A-B depict another example of structured objects representing a set of documents and a score card for those documents. FIG. 7A depicts structured object 700 representing a tax return for an individual with many investments. In particular, the structured object 700 includes a variety of fields and associated data, such as identification information. Additionally, the structured object 700 includes an income field with various income sub-fields, a deduction field with various deduction sub-fields, and a credit field with various credit sub-fields. The structured object 700 also includes taxes paid fields and supporting documentation fields.

FIG. 7B depicts an example structured object 750 representing a score card for the set of documents represented by the structured object 700. The overall health score for the set of documents represented by structured object 700 is 88 (e.g., in this example, based on a 0-100 scale), and an overall good rating. The score indicates a consistent return, but highlights a need for greater audit preparation for areas involving large transaction. Additionally, the structured object 750 includes an indication that all income is reported accurately and no compliance errors are noted, as well as correct application of the tax credits. The structured object 750 further includes a plurality of recommendations for various categories of the structured object 700. Specifically, the structured object indicates documentation for charitable donations and investment transactions are to be maintained, which are frequently of interest to tax authorities.

Returning to FIG. 4, in some aspects, workflow 400 optionally proceeds to block 412 with remediating an anomaly in the one or more documents. For example, one or more users may access a user interface to correct an anomaly or otherwise improve the quality of the set of documents. In some cases, a type of remediation may depend on the area, type, or domain of the documents. For example, for accounting documents, a remediation may be to correct a calculation, while for research documents, a remediation may be to append additional source documents.

Additionally, in some aspects, workflow 400 includes block 414, whereby the machine learning model may be updated based on one or more remedial actions taken to correct anomalies and/or improve a health score of the document. For example, the machine learning model may be retrained or retuned based on actions taken to remediate the anomalies found. When users successfully remediate anomalies or override false positives, the model is retrained or retuned on this feedback. This continuous learning enhances the model's accuracy, reducing future false flags and ensuring the health score and initial anomaly detection remain aligned with real-world tax practice.

In some aspects, the machine learning model may be updated based on a change to a domain of the documents.

Note that FIG. 4 is just one example of a workflow, and other flows including fewer, additional, or alternative operations are possible consistent with this disclosure.

Example Method for Scoring Document Compliance

Figure 8:
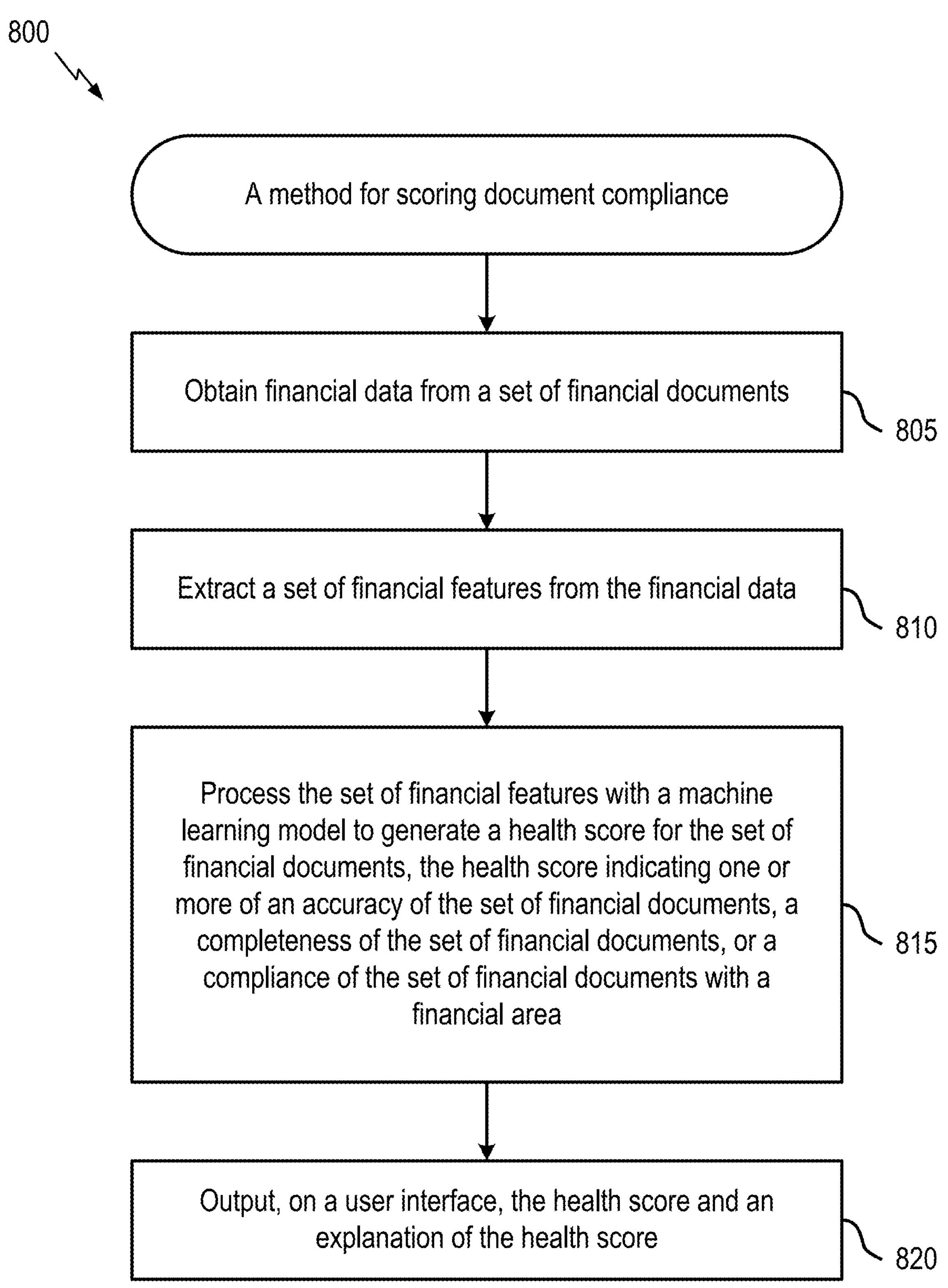
FIG. 8 is a method flow diagram illustrating an example method for anomaly detection within documents.

FIG. 8 depicts an example method 800 for scoring document compliance. In one aspect, method 800 can be implemented by the system 100 of FIG. 1 and/or processing system 1000 of FIG. 10.

Method 800 begins at block 805 with obtaining data from a set of documents, such as described with respect to block 402 of FIG. 4. In one example, the set of documents comprises financial documents and financial data is obtained from the financial documents.

Method 800 then proceeds to block 810 with extracting a set of features from the data, such as described with respect to block 406 of FIG. 4.

Method 800 then proceeds to block 815 with processing the set of features with a machine learning model to generate a health score for the set of documents, the health score indicating one or more of an accuracy of the set of documents, a completeness of the set of documents, or a compliance of the set of documents with an area, such as described with respect to block 408 of FIG. 4. Beneficially, a health score may indicate an overall quality of the documents. For example, in some cases, there may not be an identifiable anomaly (e.g., through anomaly detection), but nevertheless, the documents could be improved. A health score may be used additionally or alternatively to anomaly detection to improve quality of documents.

Method 800 then proceeds to block 820 with outputting, on a user interface, the health score and an explanation of the health score, such as described with respect to block 410 of FIG. 4.

In some aspects, block 805 includes: processing each respective document of the set of documents with natural language processing to generate a respective machine-readable document; anonymizing each respective machine-readable document by redacting personally identifiable information within the machine-readable document; and converting the machine-readable document into a structured object comprising the data, such as described with respect to block 402 of FIG. 4.

In some aspects, the structured object comprises a plurality of fields, and the method 800 further comprises validating each field of the plurality of fields comprising data from the set of documents.

In some aspects, block 810 includes: identifying, from the structured object, at least one quantitative field and at least one qualitative field; contextualizing the at least one quantitative field and the at least one qualitative field based on the area associated with the documents; and adding the at least one contextualized quantitative field and the at least one contextualized qualitative field to the set of features, such as described with respect to block 406 of FIG. 4.

In some aspects, block 815 includes processing the at least one contextualized quantitative field and the at least one contextualized qualitative field with a machine learning model trained to detect an anomaly between one or more fields of the set of features.

In some aspects, the machine learning model comprises an LSTM or a transformer. A Transformer is preferred for compliance scoring due to its Attention Mechanism, which efficiently captures long-range contextual rules across documents, offering better accuracy. LSTM is slower and struggles with broad document context. Input and training are similar (tokenized text), but the Transformer requires more data and compute for pre-training. Thus, LSTM may be used to reduce data and/or computer for pre-training.

In some aspects, the machine learning model is fine-tuned with an area corpora. For example, in some aspects, the documents may be financial documents and the model may be fine-tuned with a financial area corpora.

In some aspects, the machine learning model is augmented with an area corpora.

In some aspects, method 800 further includes reducing a dimensionality of the data before feature extraction, such as described with respect to block 404 of FIG. 4.

In some aspects, the machine learning model is trained on a corpus of documents comprising at least one compliant document and at least one erroneous document.

In some aspects, the health score sums a set of category scores, each category score indicating a health score of a category of financial data.

In some aspects, the explanation comprises a reason for each category score, the reason comprising an anomaly in the accuracy of the set of financial documents associated with the category of financial data, an anomaly in the completeness of the set of financial documents associated with the category of financial data, or an anomaly in the compliance of the set of financial documents associated with the category of financial data.

In some aspects, the health score comprises a numerical score and a rating.

In some aspects, method 800 further includes generating the explanation of the health score with XAI based on the machine learning model, such as described with respect to block 408 of FIG. 4.

In some aspects, the explanation of the health score further comprises a recommended action to correct an anomaly of the set of financial documents.

In some aspects, method 800 further includes updating the machine learning model based on a change to the financial area.

Note that FIG. 8 is just one example of a method, and other methods including fewer, additional, or alternative operations are possible consistent with this disclosure.

Example Method for Anomaly Detection

Figure 9:
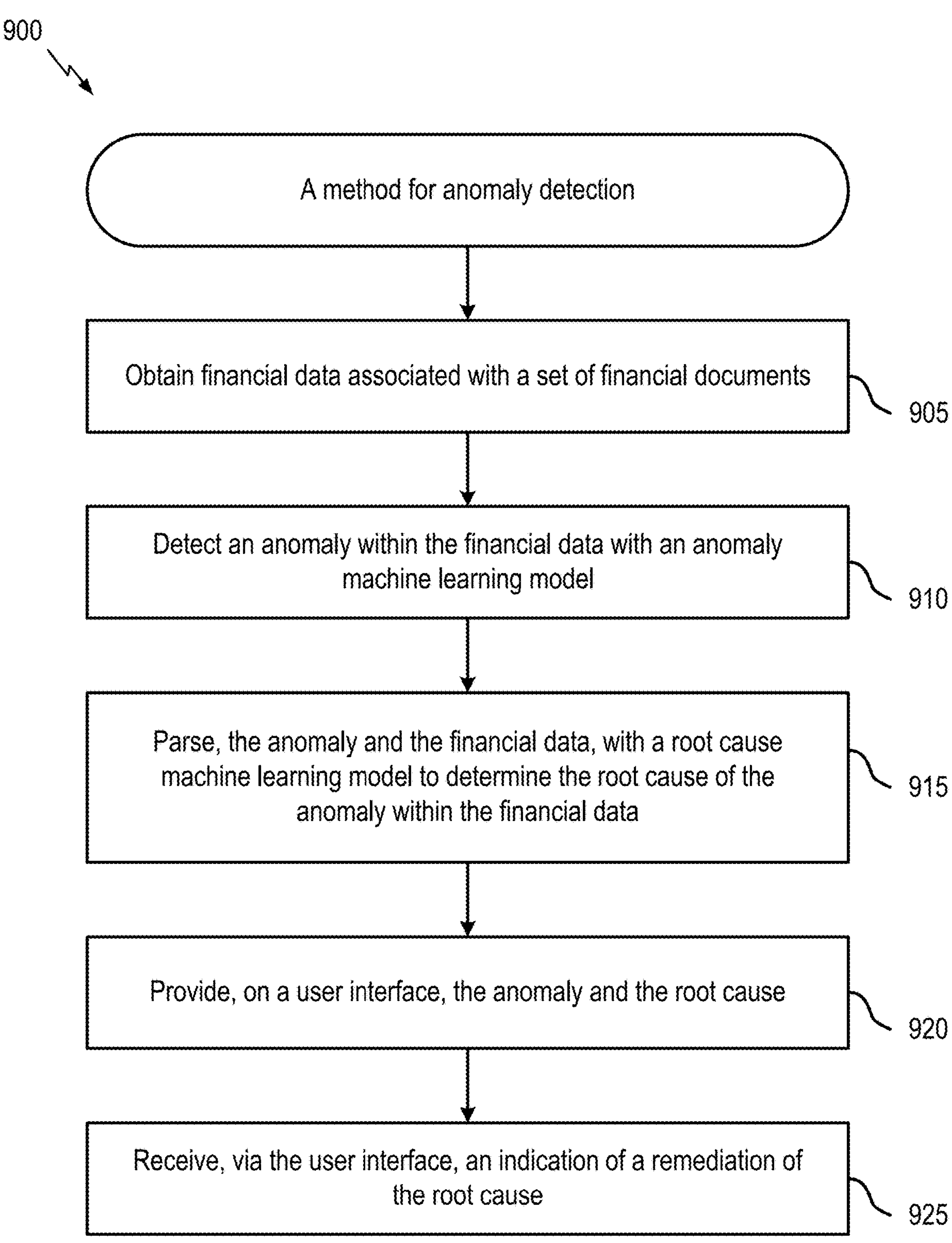
FIG. 9 is a method flow diagram illustrating an example method for analyzing the health of documents.

FIG. 9 depicts an example method 900 for anomaly detection. In one aspect, method 800 can be implemented by the system 100 of FIG. 1 and/or processing system 1000 of FIG. 10.

Method 900 begins at block 905 with obtaining data associated with a set of documents, such as described with respect to block 302 of FIG. 3. In one example, the set of documents comprises financial documents and financial data is obtained from the financial documents.

Method 900 then proceeds to block 910 with detecting an anomaly within the data with an anomaly machine learning model, such as described with respect to block 304 of FIG. 3.

Method 900 then proceeds to block 915 with parsing, the anomaly and the data, with a root cause machine learning model to determine the root cause of the anomaly within the data, such as described with respect to block 306 of FIG. 3. Beneficially, determination of a root cause enables detection of related animals within a document, as well as an appropriate location for correction. For example, where an anomaly occurs later in a document due to an issue in an earlier section, correction of the later anomaly only would not correct the earlier section. Thus, anomalies can be fully corrected, and other related anomalies, can also readily be identified and corrected.

Method 900 then proceeds to block 920 with providing, on a user interface, the anomaly and the root cause, such as described with respect to block 308 of FIG. 3.

Method 900 then proceeds to block 925 with receiving, via the user interface, an indication of a remediation of the root cause, such as described with respect to block 310 of FIG. 3.

In some aspects, the machine learning model comprises a decision tree or a causal inference model.

In some aspects, block 920 includes: visualizing, on the user interface, a chronological mapping of the financial data, the anomaly, and the root cause.

In some aspects, the chronological mapping comprises a heat map or a temporal graph.

In some aspects, method 900 further includes providing, on the user interface, at least one of the set of financial documents.

In some aspects, method 900 further includes receiving, via the user interface, from a plurality of users, an edit to the at least one of the set of financial documents, wherein the edit comprises the remediation of the root cause.

In some aspects, method 900 further includes recording, on a distributed ledger, the anomaly, the root cause, and the remediation.

In some aspects, method 900 further includes alerting, on the user interface, to the anomaly and the root cause.

Beneficially, determination of a root cause enables detection of related errors within a document (or a set of related documents), as well as an appropriate location for correction. Additionally, visualization of detected anomalies, root causes, health scores, as well as remedial actions may enable efficient resolution and remediation of documents. Further, in some cases, a collaborative interface may be provided, enabling collaborative resolution and remediation of documents. Note that FIG. 9 is just one example of a method, and other methods including fewer, additional, or alternative operations are possible consistent with this disclosure.

Example Processing System

Figure 10:
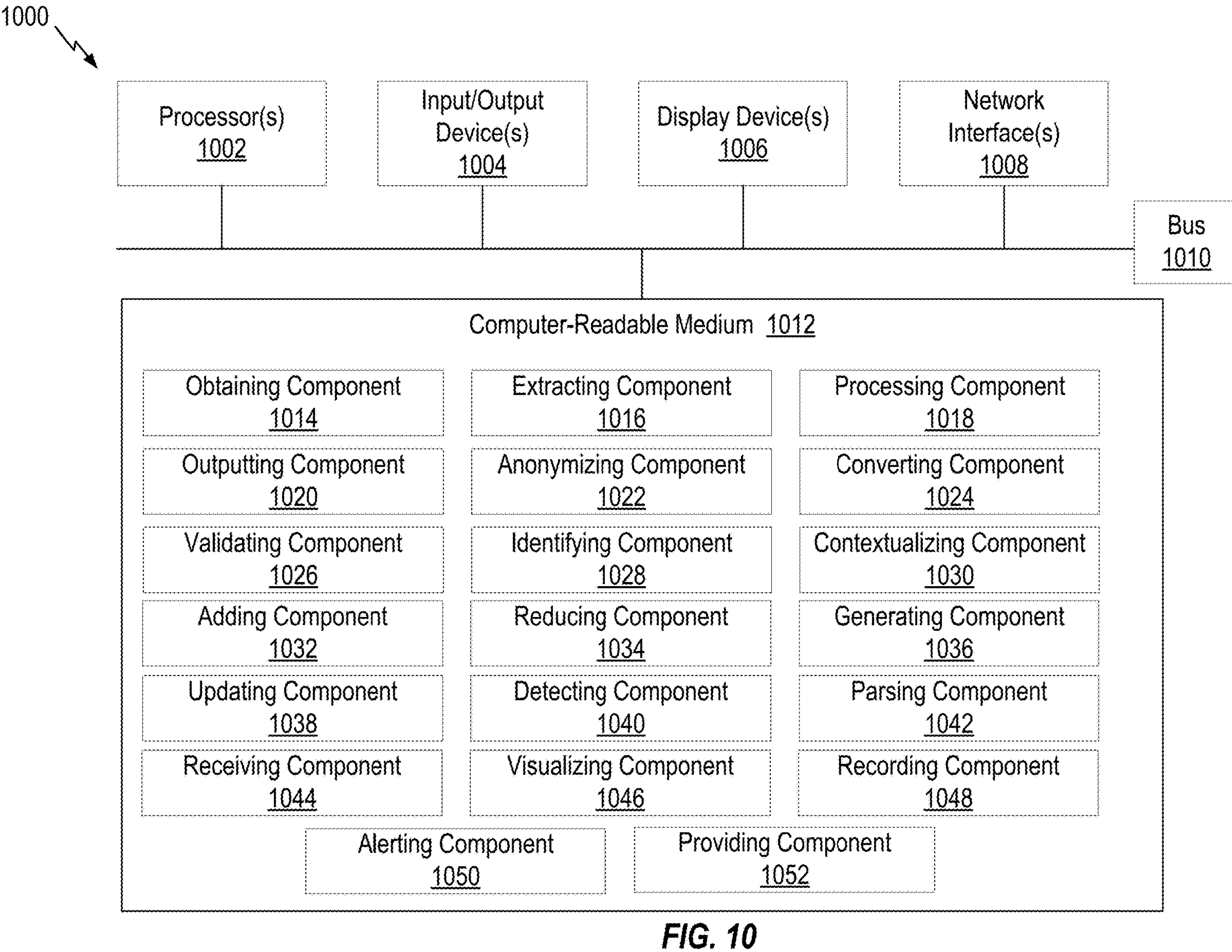
FIG. 10 depicts an example processing system with which aspects of the present disclosure can be performed.

FIG. 10 depicts an example processing system 1000 configured to perform various aspects described herein, including, for example, method 800 as described above with respect to FIG. 8 and method 900 as described above with respect to FIG. 9.

Processing system 1000 is an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1000 includes one or more processors 1002, one or more input/output devices 1004, one or more display devices 1006, one or more network interfaces 1008 through which processing system 1000 is connected to one or more networks (e.g., a local network, an intranet, the Internet, or any other group of processing systems communicatively connected to each other), and computer-readable medium 1012. In the depicted example, the aforementioned components are coupled by a bus 1010, which may generally be configured for data exchange amongst the components. Bus 1010 may be representative of multiple buses, while only one is depicted for simplicity.

Processor(s) 1002 are generally configured to retrieve and execute instructions stored in one or more memories, including local memories like computer-readable medium 1012, as well as remote memories and data stores. Similarly, processor(s) 1002 are configured to store application data residing in local memories like the computer-readable medium 1012, as well as remote memories and data stores. More generally, bus 1010 is configured to transmit programming instructions and application data among the processor(s) 1002, display device(s) 1006, network interface(s) 1008, and/or computer-readable medium 1012. In certain embodiments, processor(s) 1002 are representative of a one or more central processing units (CPUs), graphics processing unit (GPUs), tensor processing unit (TPUs), accelerators, and other processing devices.

Input/output device(s) 1004 may include any device, mechanism, system, interactive display, and/or various other hardware and software components for communicating information between processing system 1000 and a user of processing system 1000. For example, input/output device(s) 1004 may include input hardware, such as a keyboard, touch screen, button, microphone, speaker, and/or other device for receiving input from the user and sending outputs to the user.

Display device(s) 1006 may generally include any sort of device configured to display data, information, graphics, user interface elements, and the like to a user. For example, display device(s) 1006 may include internal and external displays such as an internal display of a tablet computer or an external display for a server computer or a projector. Display device(s) 1006 may further include displays for devices, such as augmented, virtual, and/or extended reality devices. In various embodiments, display device(s) 1006 may be configured to display a graphical user interface.

Network interface(s) 1008 provide processing system 1000 with access to external networks and thereby to external processing systems. Network interface(s) 1008 can generally be any hardware and/or software capable of transmitting and/or receiving data via a wired or wireless network connection. Accordingly, network interface(s) 1008 can include a communication transceiver for sending and/or receiving any wired and/or wireless communication.

Computer-readable medium 1012 may be a volatile memory, such as a random access memory (RAM), or a nonvolatile memory, such as nonvolatile random access memory (NVRAM), or the like. In this example, computer-readable medium 1012 includes obtaining component 1014, extracting component 1016, processing component 1018, outputting component 1020, anonymizing component 1022, converting component 1024, validating component 1026, identifying component 1028, contextualizing component 1030, adding component 1032, reducing component 1034, generating component 1036, updating component 1038, detecting component 1040, parsing component 1042, receiving component 1044, visualizing component 1046, recording component 1048, alerting component 1050, and providing component 1052. Processing of the components 1014-1052 may enable and cause the processing system 1000 to perform the method 800 described with respect to FIG. 8, the method 900 described with respect to FIG. 983 or any aspect related to it.

In certain embodiments, obtaining component 1014 is configured to obtain data from a set of documents, as described in FIG. 8 with reference to block 805. In certain embodiments, extracting component 1016 is configured to extract a set of features from the data, as described in FIG. 8 with reference to block 810. In certain embodiments, processing component 1018 is configured to process the set of features with a machine learning model to generate a health score for the set of documents, the health score indicating one or more of an accuracy of the set of documents, a completeness of the set of documents, or a compliance of the set of documents with an area, as described in FIG. 8 with reference to block 815. In certain embodiments, outputting component 1020 is configured to output, on a user interface, the health score and an explanation of the health score, as described in FIG. 8 with reference to block 820.

In certain embodiments, obtaining component 1014 is configured to obtain data associated with a set of documents, as described in FIG. 9 with reference to block 905. In certain embodiments, detecting component 1040 is configured to detect an anomaly within the data with an anomaly machine learning model, as described in FIG. 9 with reference to block 910. In certain embodiments, parsing component 1042 is configured to parse the anomaly and the data, with a root cause machine learning model to determine the root cause of the anomaly within the data, as described in FIG. 9 with reference to block 915. In certain embodiments, providing component 1052 is configured to provide, on a user interface, the anomaly and the root cause, as described in FIG. with reference to block 920. In certain embodiments, receiving component 1044 is configured to receive, via the user interface, an indication of a remediation of the root cause, as described in FIG. 9 with reference to block 925.

Note that FIG. 10 is just one example of a processing system consistent with aspects described herein, and other processing systems having additional, alternative, or fewer components are possible consistent with this disclosure.

Example Clauses

Implementation examples are described in the following numbered clauses:

Clause 1: A method for scoring document compliance, comprising: obtaining financial data from a set of financial documents; extracting a set of financial features from the financial data; processing the set of financial features with a machine learning model to generate a health score for the set of financial documents, the health score indicating one or more of an accuracy of the set of financial documents, a completeness of the set of financial documents, or a compliance of the set of financial documents with a financial area; and outputting, on a user interface, the health score and an explanation of the health score.

Clause 2: The method of Clause 1, wherein obtaining the financial data from the set of financial documents, comprises: processing each respective financial document of the set of financial documents with natural language processing to generate a respective machine-readable financial document; anonymizing each respective machine-readable financial document by redacting personally identifiable information within the machine-readable financial document; and converting the machine-readable financial document into a structured object comprising the financial data.

Clause 3: The method of Clause 2, wherein: the structured object comprises a plurality of fields, and the method further comprises validating each field of the plurality of fields comprising data from the set of financial documents.

Clause 4: The method of Clause 2, wherein extracting the set of financial features from the financial data comprises: identifying, from the structured object, at least one quantitative field and at least one qualitative field; contextualizing the at least one quantitative field and the at least one qualitative field based on the financial area associated with the financial documents; and adding the at least one contextualized quantitative field and the at least one contextualized qualitative field to the set of financial features.

Clause 5: The method of Clause 4, wherein processing the set of financial features with the machine learning model to generate the health score for the set of financial documents, comprises processing the at least one contextualized quantitative field and the at least one contextualized qualitative field with a machine learning model trained to detect an anomaly between one or more fields of the set of financial features.

Clause 6: The method of Clause 5, wherein the machine learning model comprises a LSTM or a transformer.

Clause 7: The method of Clause 5, wherein the machine learning model is fine-tuned with a financial area corpora.

Clause 8: The method of Clause 5, wherein the machine learning model is augmented with a financial area corpora.

Clause 9: The method of any one of Clauses 1-8, further comprising reducing a dimensionality of the financial data before feature extraction.

Clause 10: The method of any one of Clauses 1-9, wherein the machine learning model is trained on a corpus of financial documents comprising at least one compliant financial document and at least one erroneous financial document.

Clause 11: The method of any one of Clauses 1-10, wherein the health score sums a set of category scores, each category score indicating a health score of a category of financial data.

Clause 12: The method of any one of Clauses 1-11, wherein the explanation comprises a reason for each category score, the reason comprising an anomaly in the accuracy of the set of financial documents associated with the category of financial data, an anomaly in the completeness of the set of financial documents associated with the category of financial data, or an anomaly in the compliance of the set of financial documents associated with the category of financial data.

Clause 13: The method of any one of Clauses 1-12, wherein the health score comprises a numerical score and a rating.

Clause 14: The method of any one of Clauses 1-13, further comprising generating the explanation of the health score with XAI based on the machine learning model.

Clause 15: The method of Clause 14, wherein the explanation of the health score further comprises a recommended action to correct an anomaly of the set of financial documents.

Clause 16: The method of any one of Clauses 1-15, further comprising updating the machine learning model based on a change to the financial area.

Clause 17: The method of any one of Clause 1-16, further comprising: detecting an anomaly within the financial data with an anomaly machine learning model; and parsing, the anomaly and the financial data, with a root cause machine learning model to determine a root cause of the anomaly within the financial data; wherein, the explanation of the health score comprises the anomaly and the root cause.

Clause 18: The method of Clause 17, wherein the root cause machine learning model comprises a decision tree or a causal inference model.

Clause 19: The method of any one of Clause 17-18, wherein the anomaly and the root cause are outputted as part of a chronological mapping of the financial data Clause 20: The method of Clause 19, wherein the chronological mapping comprises a heat map or a temporal graph.

Clause 21: The method of any one of Clause 17-20, further comprising providing, on the user interface, at least one of the set of financial documents; and receiving, via the user interface, from at least one of a plurality of users, an edit to the at least one of the set of financial documents, wherein the edit comprises the remediation of the root cause.

Clause 22: The method of any one of Clause 17-21, further comprising recording, on a distributed ledger, the anomaly, the root cause, and the remediation.

Clause 23: The method of any one of Clause 17-22, further comprising alerting, on the user interface, to the anomaly and the root cause.

Clause 24: A method for anomaly detection, comprising: obtaining financial data associated with a set of financial documents; detecting an anomaly within the financial data with an anomaly machine learning model; parsing, the anomaly and the financial data, with a root cause machine learning model to determine the root cause of the anomaly within the financial data; providing, on a user interface, the anomaly and the root cause; and receiving, via the user interface, an indication of a remediation of the root cause.

Clause 25: The method of Clause 24, wherein the machine learning model comprises a decision tree or a causal inference model.

Clause 26: The method of any one of Clauses 24-25, wherein providing, on the user interface, the anomaly and the root cause, comprises: visualizing, on the user interface, a chronological mapping of the financial data, the anomaly, and the root cause.

Clause 27: The method of Clause 26, wherein the chronological mapping comprises a heat map or a temporal graph.

Clause 28: The method of any one of Clauses 24-27, further comprising: providing, on the user interface, at least one of the set of financial documents; and receiving, via the user interface, from a plurality of users, an edit to the at least one of the set of financial documents, wherein the edit comprises the remediation of the root cause.

Clause 29: The method of any one of Clauses 24-28, further comprising recording, on a distributed ledger, the anomaly, the root cause, and the remediation.

Clause 30: The method of any one of Clauses 24-29, further comprising alerting, on the user interface, to the anomaly and the root cause.

Clause 31: A processing system, comprising: memory comprising computer-executable instructions; and one or more processors configured to execute the computer-executable instructions and cause the processing system to perform a method in accordance with any one of Clauses 1-30.

Clause 32: A processing system, comprising means for performing a method in accordance with any one of Clauses 1-30.

Clause 33: A non-transitory computer-readable medium storing program code for causing a processing system to perform the steps of any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system, comprising: memory comprising computer-executable instructions; and one or more processors configured to execute the computer-executable instructions and cause the processing system to perform steps comprising:

obtaining financial data from a set of financial documents, comprising:

processing each respective financial document of the set of financial documents with natural language processing to generate a respective machine-readable financial document;

anonymizing each respective machine-readable financial document by redacting personally identifiable information within the respective machine-readable financial document; and converting each respective machine-readable financial document into a structured object comprising the financial data;

extracting a set of financial features from the financial data;

processing the set of financial features with a machine learning model to generate a health score for the set of financial documents, the health score comprising a set of category scores, each category score indicating one of an accuracy of the set of financial documents, a completeness of the set of financial documents, or a compliance of the set of financial documents with a financial area;

detecting an anomaly within the financial data with an anomaly machine learning model;

parsing the anomaly and the financial data with a root cause machine learning model;

determining a root cause of the anomaly within the financial data;

generating, with explainable artificial intelligence (XAI), an explanation of the health score based on processing the set of financial features with the machine learning model, wherein the explanation of the health score indicates a reason for each category score of the set of category scores, and the explanation of the health score indicates the anomaly and the root cause;

outputting, on a user interface, the health score and the explanation of the health score;

providing, on the user interface, at least one financial document of the set of financial documents; and receiving, via the user interface, from at least one of a plurality of users, an edit to the at least one financial document of the set of financial documents, wherein the edit comprises a remediation of the root cause.

2. The processing system of claim 1, wherein:

the structured object comprises a plurality of fields, and the step further comprises validating each field of the plurality of fields comprising data from the set of financial documents.

3. The processing system of claim 1, wherein extracting the set of financial features from the financial data, comprises:

identifying, from the structured object, at least one quantitative field and at least one qualitative field;

contextualizing the at least one quantitative field and the at least one qualitative field based on the financial area associated with the set of financial documents; and adding the at least one contextualized quantitative field and the at least one contextualized qualitative field to the set of financial features.

4. The processing system of claim 3, wherein processing the set of financial features with the machine learning model to generate the health score for the set of financial documents, comprises processing the at least one contextualized quantitative field and the at least one contextualized qualitative field with the machine learning model trained to detect an anomaly between one or more fields of the set of financial features.

5. The processing system of claim 1, wherein the steps further comprise reducing a dimensionality of the financial data before feature extraction.

6. The processing system of claim 1, wherein the machine learning model is trained on a corpus of financial documents comprising at least one compliant financial document and at least one erroneous financial document.

7. The processing system of claim 1, wherein the health score sums the set of category scores.

8. The processing system of claim 1, wherein the health score comprises a numerical score and a rating.

9. The processing system of claim 1, wherein the explanation of the health score further comprises a recommended action to increase the health score of the set of financial documents.

10. The processing system of claim 9, further comprising alerting, on the user interface, to the anomaly and the root cause.

11. The processing system of claim 9, wherein outputting, on the user interface, the health score and the explanation of the health score comprises visualizing, on the user interface, a scorecard indicating the health score, the set of category scores, the explanation of the health score, and the recommended action.

12. The processing system of claim 9, wherein providing, on the user interface, the anomaly and the root cause, comprises visualizing, on the user interface, a chronological mapping of the financial data, the anomaly, and the root cause, wherein the chronological mapping comprises a heat map or a temporal graph.

13. A processing system, comprising: memory comprising computer-executable instructions; and one or more processors configured to execute the computer-executable instructions and cause the processing system to steps comprising:

obtaining financial data from a set of financial documents, comprising:

processing each respective financial document of the set of financial documents with natural language processing to generate a respective machine-readable financial document;

anonymizing each respective machine-readable financial document by redacting personally identifiable information within the machine-readable financial document; and converting each respective machine-readable financial document into a structured object comprising the financial data;

extracting a set of financial features from the financial data, comprising:

identifying, from the structured object, at least one quantitative field and at least one qualitative field;

contextualizing the at least one quantitative field and the at least one qualitative field based on the financial area associated with the set of financial documents; and adding the at least one contextualized quantitative field and the at least one contextualized qualitative field to the set of financial features;

processing the set of financial features with a machine learning model to generate a health score for the set of financial documents, the health score comprising a set of category scores, each category score indicating one of an accuracy of the set of financial documents, a completeness of the set of financial documents, or a compliance of the set of financial documents with a financial area;

detecting an anomaly within the financial data with an anomaly machine learning model;

parsing the anomaly and the financial data with a root cause machine learning model;

determining a root cause of the anomaly within the financial data;

generating, with explainable artificial intelligence (XAI), an explanation of the health score based on processing the set of financial features with the machine learning model, wherein;

the explanation of the health score indicates a reason for each category score of the set of category scores, the explanation of the health score indicates the anomaly and the root cause, and the explanation of the health score further comprises a recommended action to increase the health score of the set of financial documents; and outputting, on a user interface, the health score and the explanation of the health score;

providing, on the user interface, at least one financial document of the set of financial documents; and receiving, via the user interface, from at least one of a plurality of users, an edit to the at least one financial document of the set of financial documents, wherein the edit comprises a remediation of the root cause or the recommended action to increase the health score.

14. The processing system of claim 13, wherein:

the structured object comprises a plurality of fields, and the method further comprises validating each field of the plurality of fields comprising data from the set of financial documents.

15. The processing system of claim 13, wherein processing the set of financial features with the machine learning model to generate the health score for the set of financial documents, comprises processing the at least one contextualized quantitative field and the at least one contextualized qualitative field with the machine learning model trained to detect an anomaly between one or more fields of the set of financial features.

16. The processing system of claim 13, wherein the steps further comprise reducing a dimensionality of the financial data before feature extraction.

17. The processing system of claim 13, wherein the machine learning model is trained on a corpus of financial documents comprising at least one compliant financial document and at least one erroneous financial document.

* * * * *